May 3, 1932.  J. SPADAFORA  1,856,296
COUNTER STIFFENER MOLDING MACHINE
Filed May 28, 1929   10 Sheets-Sheet 1
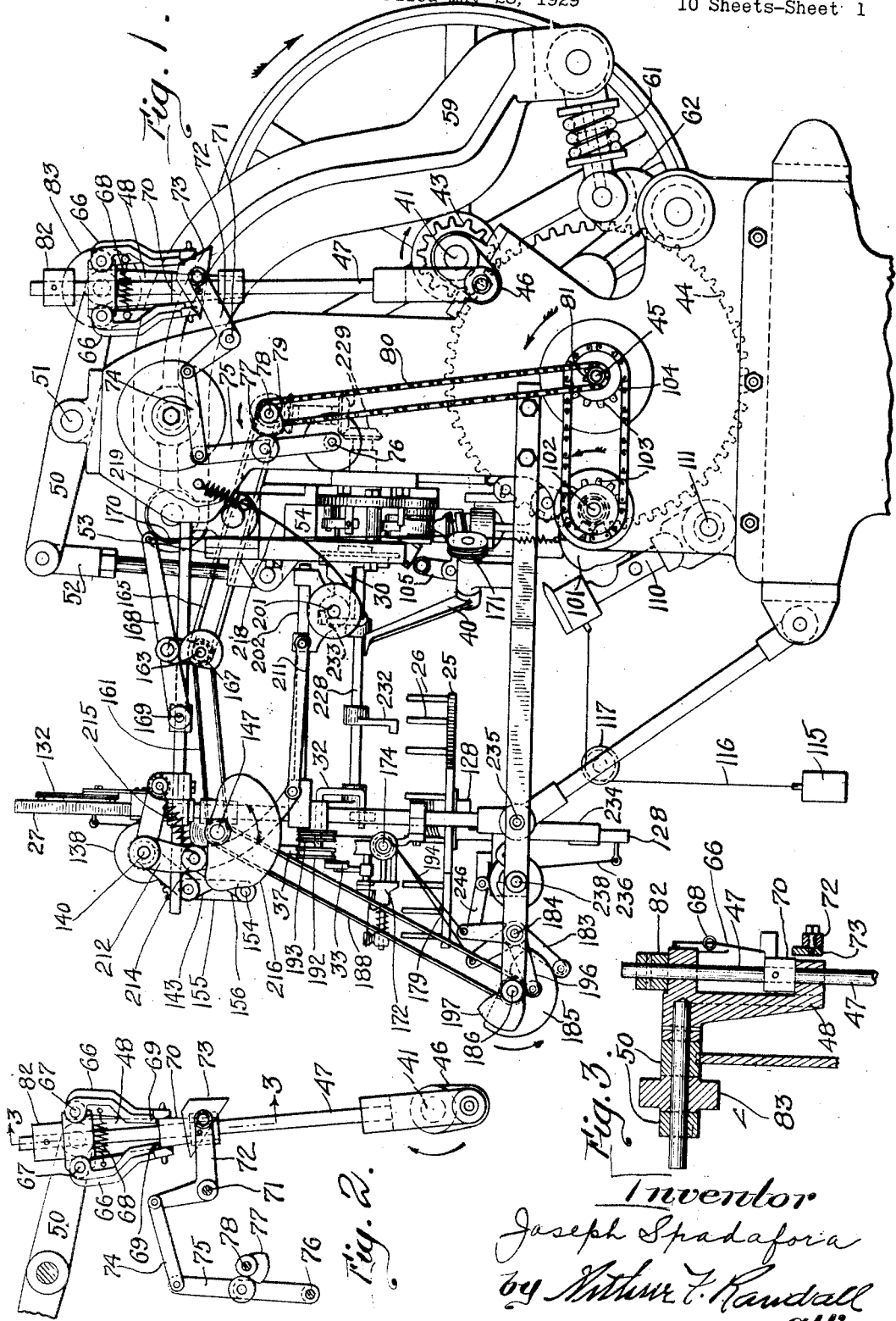
Inventor
Joseph Spadafora
by Arthur F. Randall
Atty.

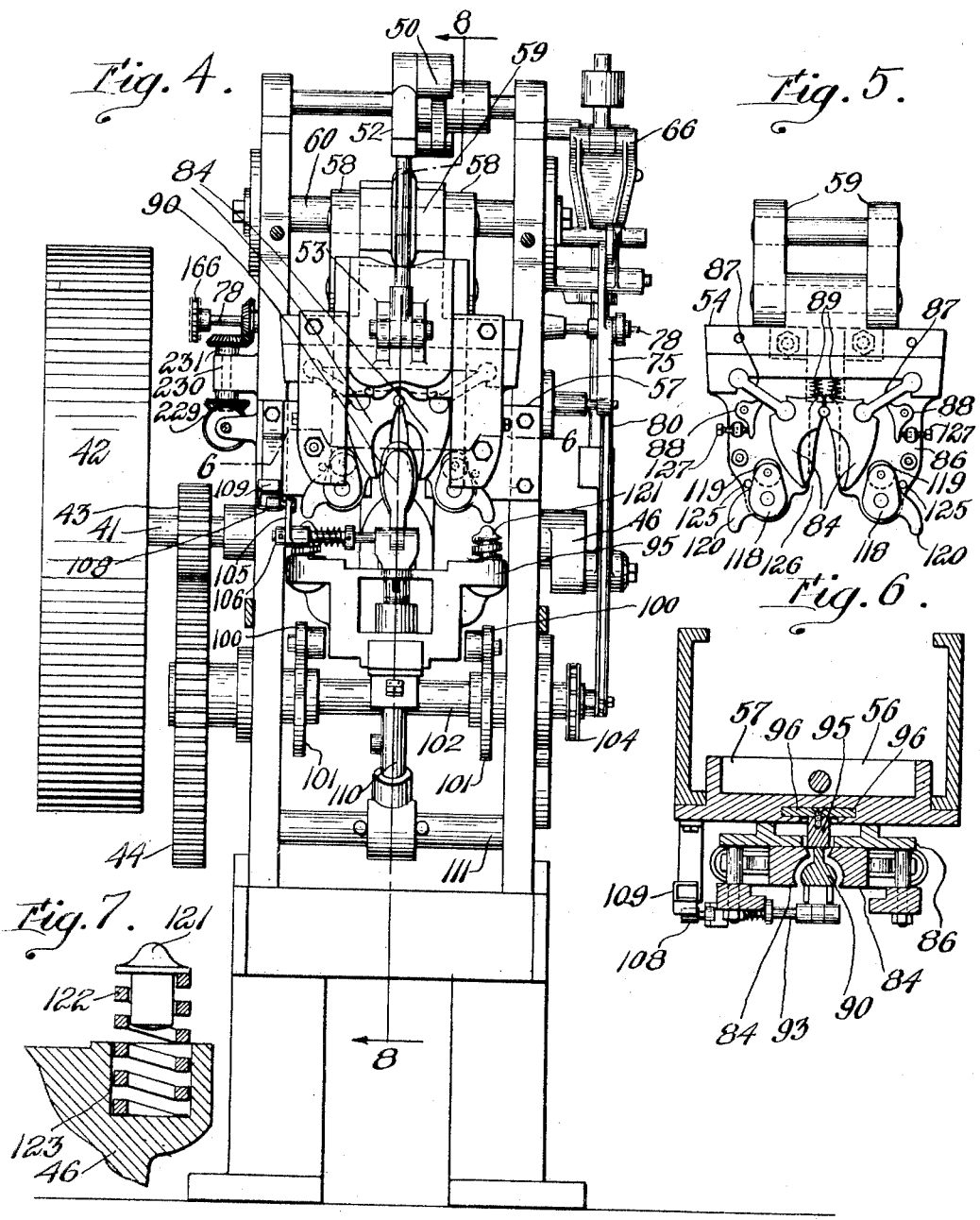

May 3, 1932.  J. SPADAFORA  1,856,296
COUNTER STIFFENER MOLDING MACHINE
Filed May 28, 1929   10 Sheets-Sheet 3
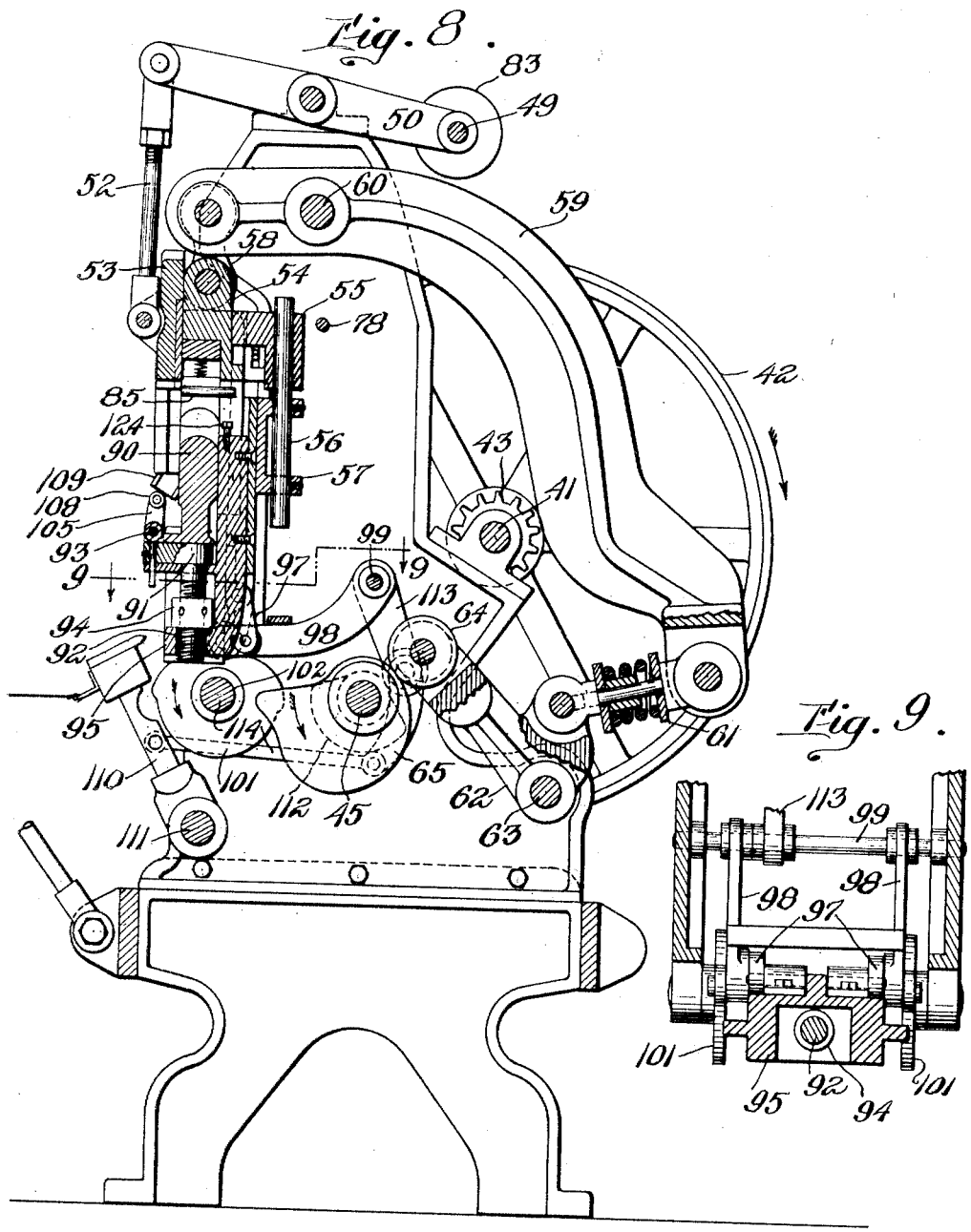

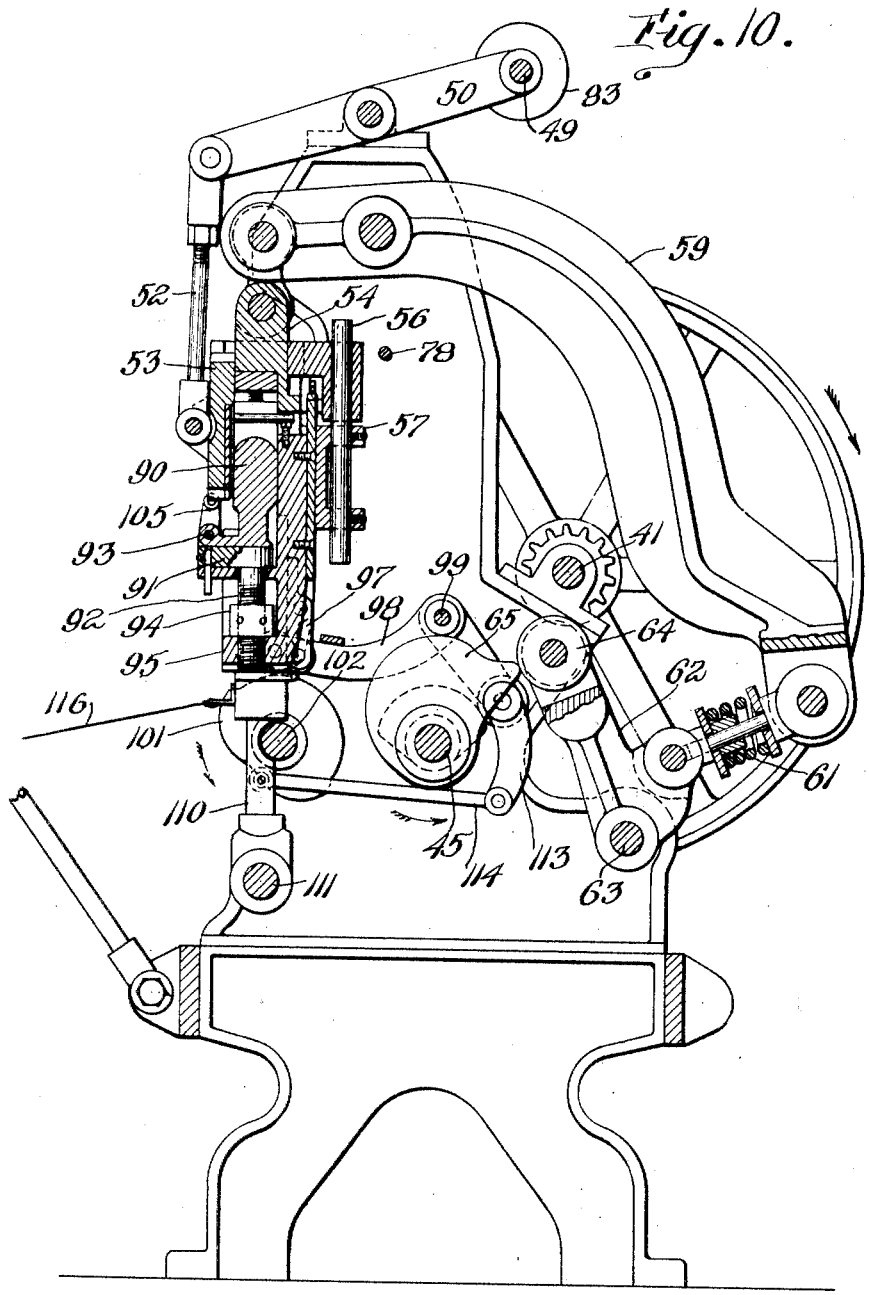

May 3, 1932.  J. SPADAFORA  1,856,296
COUNTER STIFFENER MOLDING MACHINE
Filed May 28, 1929  10 Sheets-Sheet 5
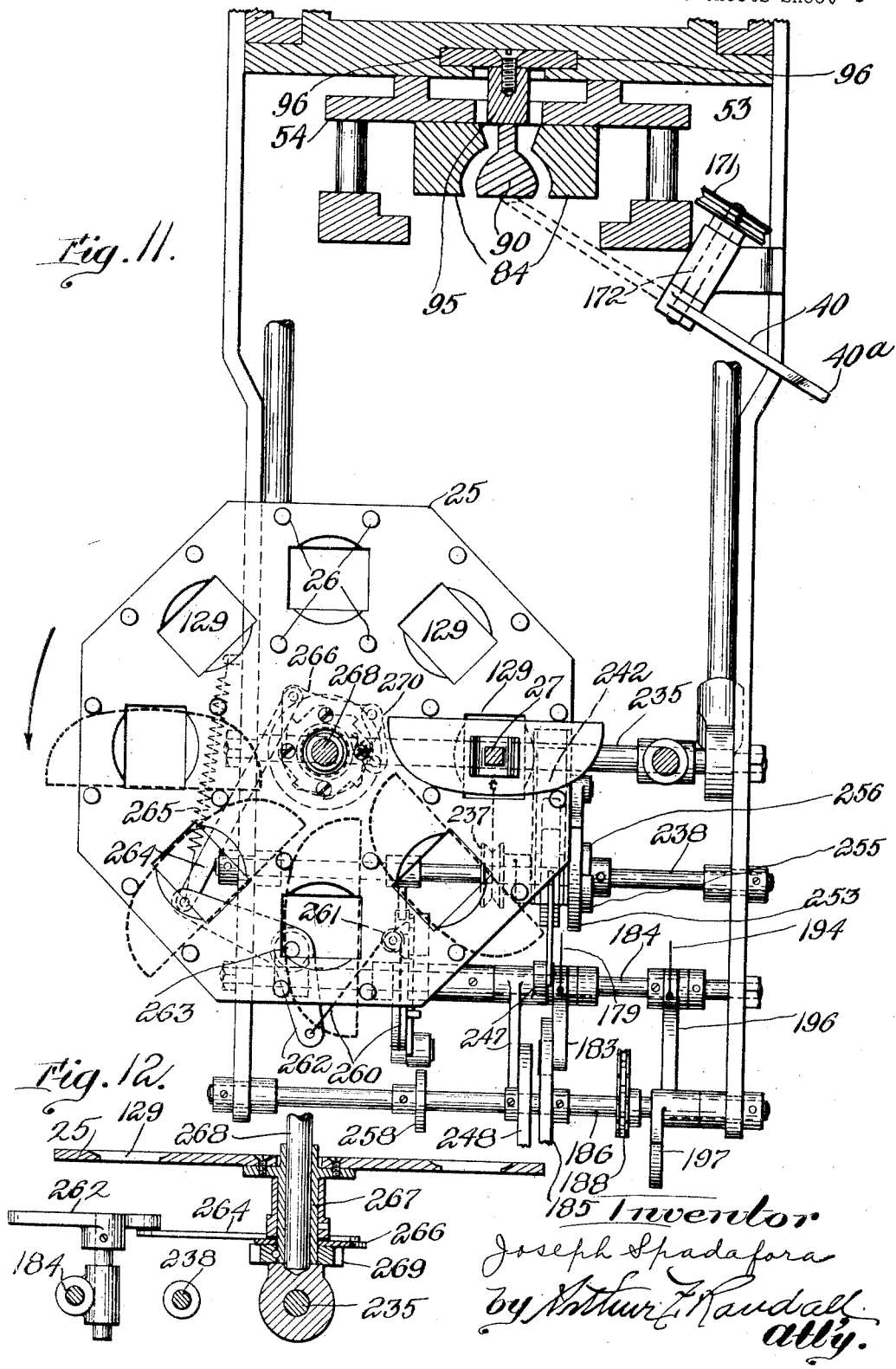

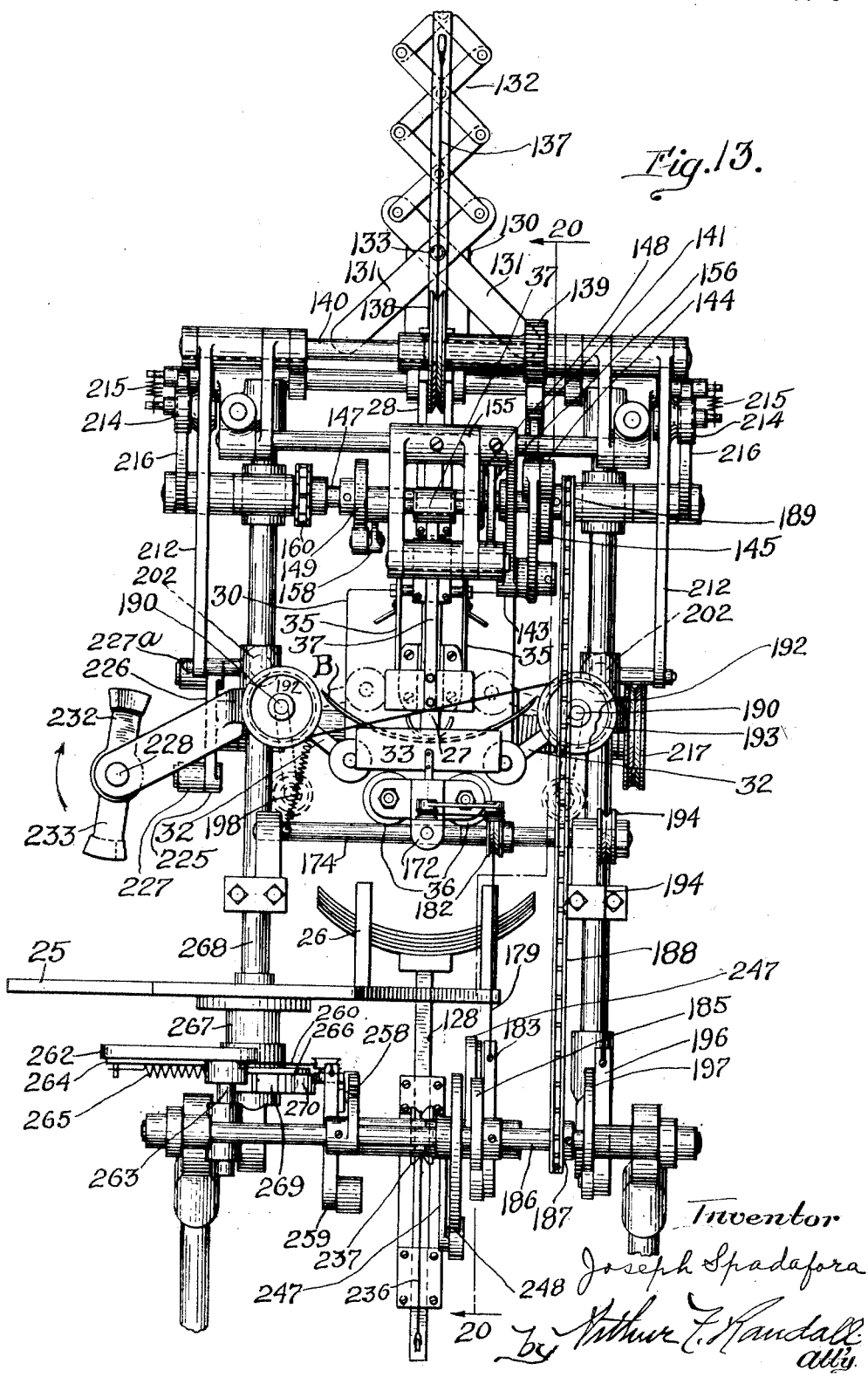

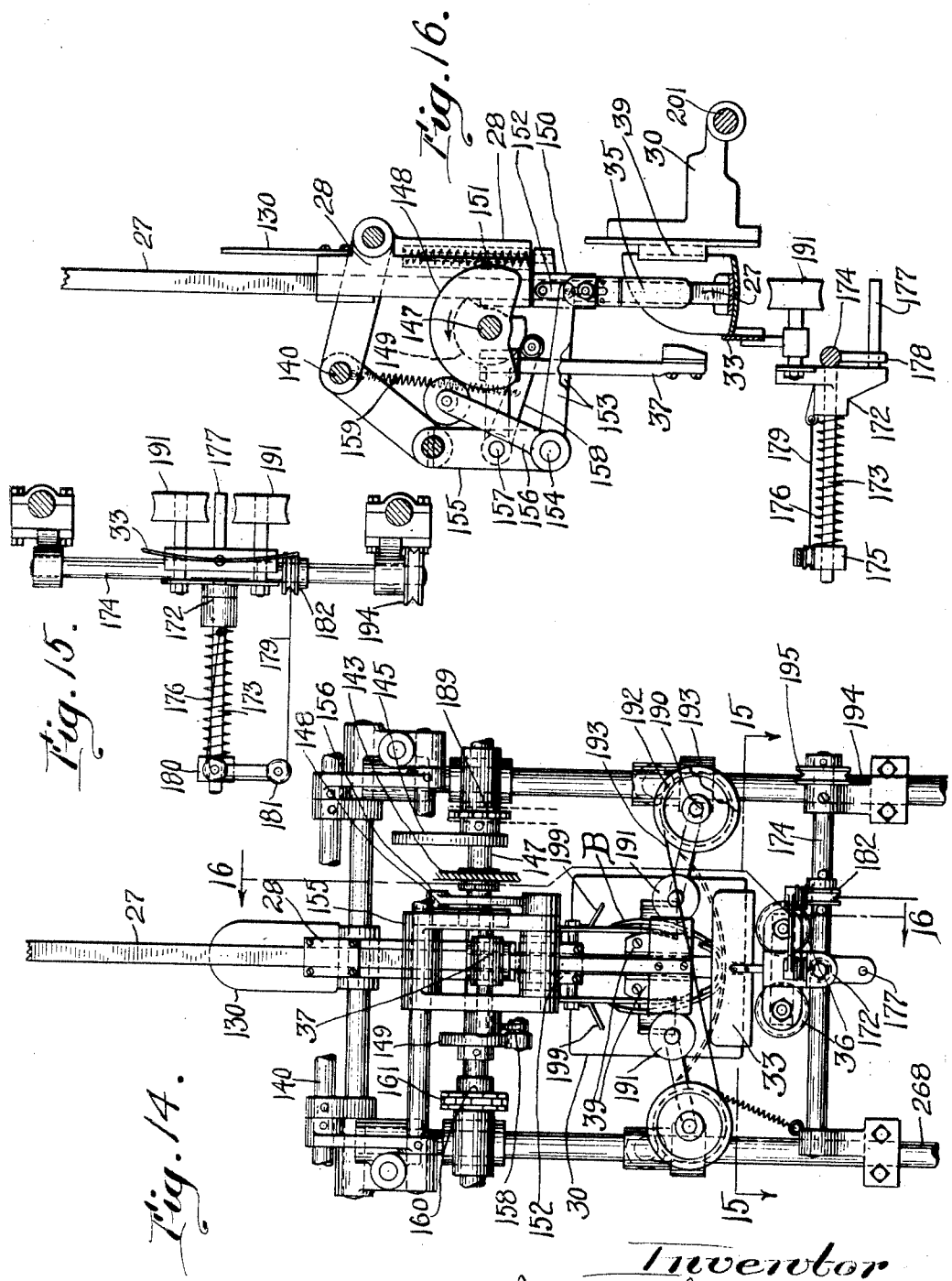

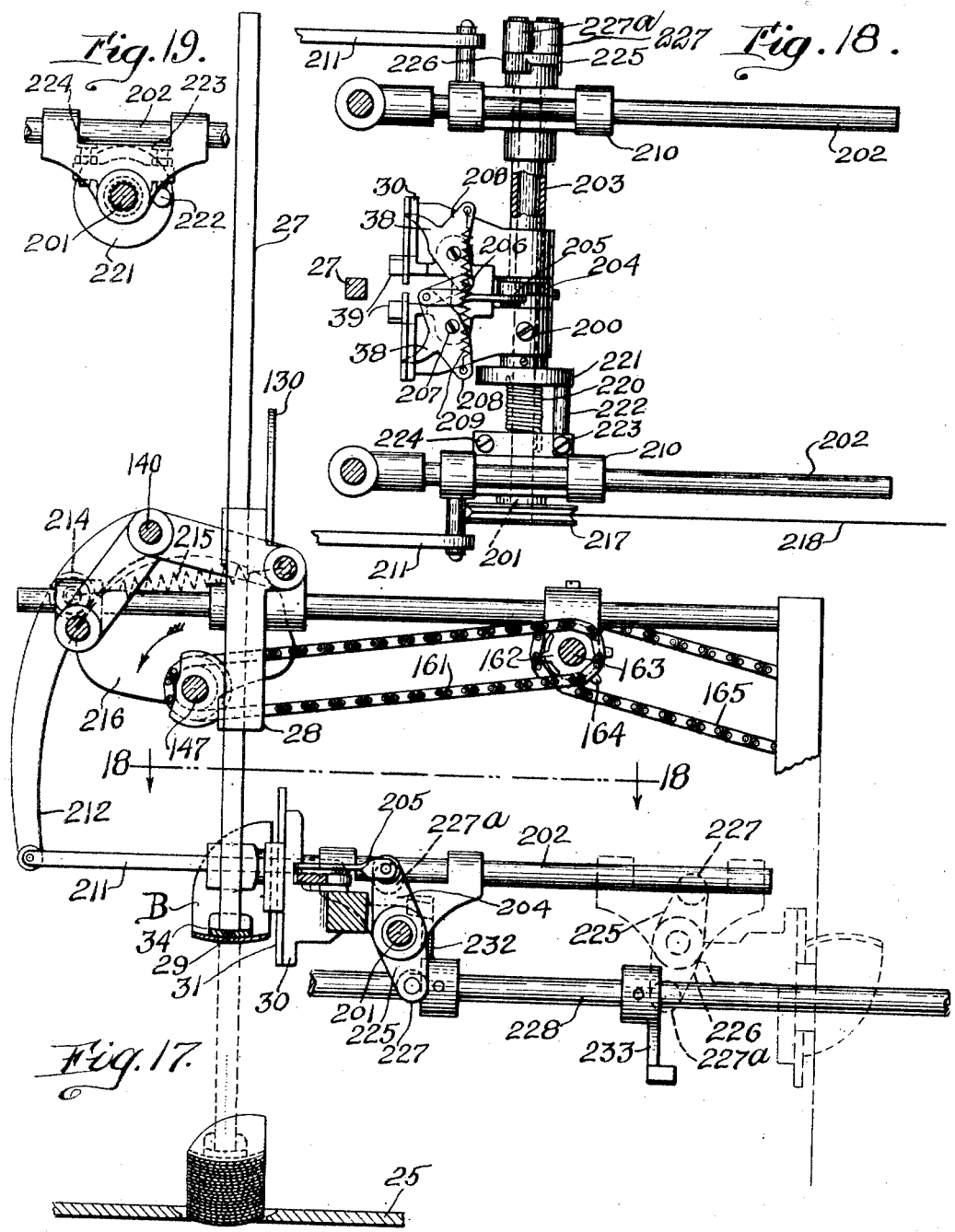

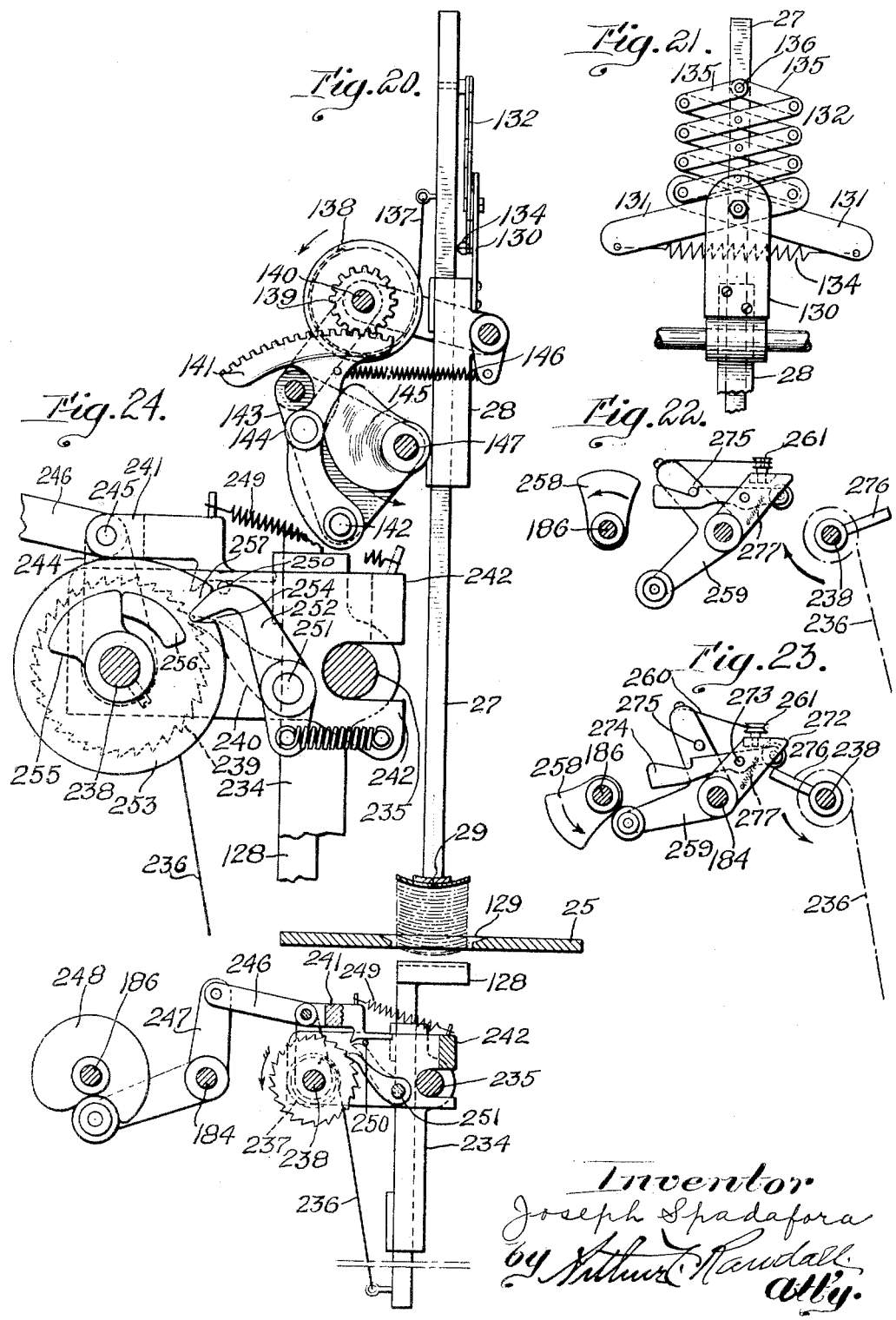

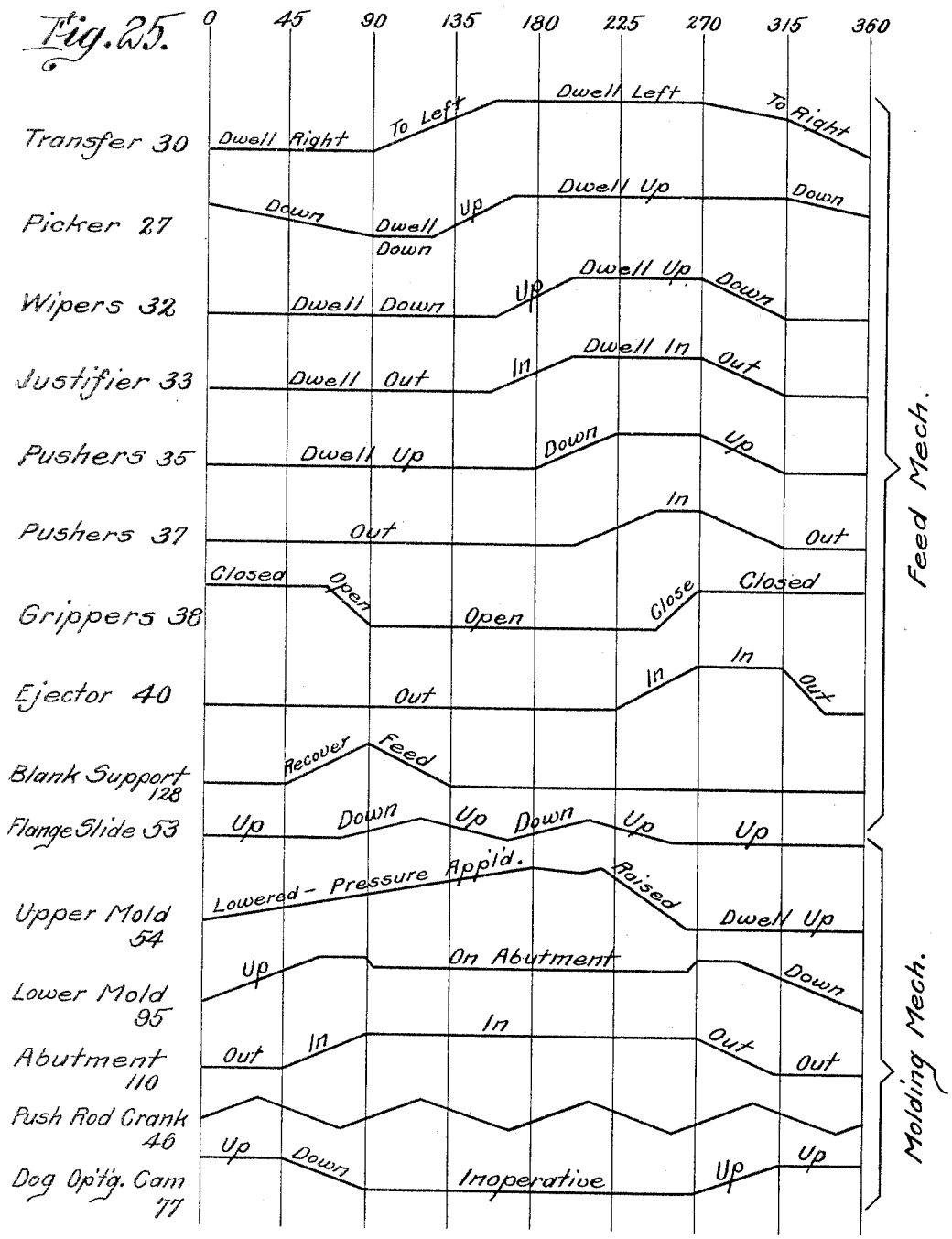

Patented May 3, 1932

1,856,296

UNITED STATES PATENT OFFICE

JOSEPH SPADAFORA, OF MEDFORD, MASSACHUSETTS, ASSIGNOR OF ONE-THIRD TO DONALD MALAGUTI AND ONE-THIRD TO LIONEL MALAGUTI, BOTH OF BOSTON, MASSACHUSETTS

COUNTER STIFFENER MOLDING MACHINE

Application filed May 23, 1929. Serial No. 366,728.

My invention relates to machines for molding counter stiffeners for boots and shoes and it has for its object to provide an improved machine of this class and particularly to provide an improved counter stiffener molding machine wherein the stiffener blanks are automatically fed to the molding mechanism.

To these ends I have provided an improved machine for molding counter stiffeners for boots and shoes, said machine, in its best form, embodying the peculiar features of construction and having the peculiar mode of operation, set forth in the following description, the several novel features of my invention being particularly pointed out and defined in the claims at the close thereof.

In the accompanying drawings:

Fig. 1 is a side elevation of a counter stiffener molding machine constructed in accordance with my invention.

Fig. 2 is a detail relating to the controlling and actuating mechanism for the flange bending member of the molding mechanism of the machine shown in Fig. 1.

Fig. 3 is a section on line 3—3 of Fig. 2.

Fig. 4 is a front elevation of the molding mechanism of the machine shown in Fig. 1.

Fig. 5 is a front elevation of the two-part female molding member of the mechanism shown in Fig. 4.

Fig. 6 is a section on line 6—6 of Fig. 4.

Fig. 7 is a sectional detail hereinafter described.

Fig. 8 is a section on line 8—8 of Fig. 4.

Fig. 9 is a section on line 9—9 of Fig. 8.

Fig. 10 is a view like Fig. 8 but showing the parts in different positions.

Fig. 11 is a plan view, partly in section and broken away, of a portion of the feed mechanism hereinafter described.

Fig. 12 is a vertical sectional detail relating to the turntable or holder for the reserve supply of blanks hereinafter described and its actuating mechanism.

Fig. 13 is a front elevation of the feed mechanism hereinafter described.

Fig. 14 is a front elevation of the upper portion of some of the structure illustrated in Fig. 13 but showing some of the parts in different positions.

Fig. 15 is a partial section on line 15—15 of Fig. 14.

Fig. 16 is a partial section on line 16—16 of Fig. 14.

Fig. 17 is a side elevation, partly in section, of portions of the picker and transfer mechanisms hereinafter described.

Fig. 18 is a partial section on line 18—18 of Fig. 17.

Fig. 19 is a detail hereinafter described.

Fig. 20 is a partial section on line 20—20 of Fig. 13.

Fig. 21 is a detail relating to the actuating mechanism for the picker hereinafter described.

Figs. 22 and 23 are details relating to the actuating mechanism for the turntable for holding the reserve supply of blanks.

Fig. 24 is a detail on larger scale of a portion of the actuating and controlling mechanism for the blank support hereinafter described.

Fig. 25 is a diagram illustrating approximately the timing and operations of the main elements of the machine herein illustrated.

In the illustrated embodiment of my invention a reserve supply of stiffener blanks is maintained upon a turntable 25, Figs. 1, 11, 12, and 13, arranged in a plurality of stacks disposed in a circular series around the axis of the turntable, each of said stacks being held or confined between posts 26 and containing twenty blanks. Associated with the turntable 25 is a vertically disposed picker bar 27 slidably mounted in ways provided on a bracket 28, Figs. 17 and 21 forming part of the frame of the machine.

At its lower end the picker bar 27 is provided with a spike 29 and during the operation of the machine said picker bar is reciprocated endwise once during each cycle. Normally a stack of stiffener blanks is supported directly below the lower end of the picker bar 27 and when said bar is reciprocated it descends to said stack and the topmost blank B is impaled upon the spike 29 whereupon the picker bar rises carrying the blank with it into an elevated position where it dwells for a time directly in front of and close to a transfer member 30 as shown in Figs. 13 and 17.

When the picker bar reaches this elevated position with the blank the latter is approximately in a horizontal position with its straight side edge adjacent the flat face 31 of the transfer member 30. As the blank B is brought into this position a justifying member 33 moves toward the blank and by engagement with the end portions thereof at opposite sides of the spike serves to angularly position the blank on the spike so that its straight edge is parallel with the face 31 of the transfer member 30.

Thereupon a pair of wipers 32 swing upwardly from below the blank and bend the opposite end portions of the latter from the positions shown in Fig. 13 to the positions shown in Fig. 14, the lower end of the picker bar 27 being provided with a laterally arcuate shoe 34 which serves as an abutment form around which the blank is bent by the wipers 32.

When the opposite end portions of the blank B are bent upwardly and inwardly by the wipers 32 as shown in Fig. 14, said end portions are brought to bear against the opposite sides of a pair of pusher fingers 35 which immediately descend carrying the blank downwardly with them into a position where its bent middle portion rests upon, and between, a pair of supporting rolls 36, this downward movement of the blank obviously freeing the latter from the spike of the picker bar 27.

As the blank is moved downwardly by the pusher fingers 35 another pusher member 37 moves toward and against the blank so as to shove the latter edgewise rearwardly against the vertical flat face 31 of the transfer member 30.

A pair of gripper members 38, Figs. 17 and 18, immediately thereafter clamp the opposite end portions of the blank against a pair of lugs 39 provided upon the face 31 of the transfer member 30.

As soon as the grippers 38 close in against the blank the transfer member 30 starts to move bodily horizontally toward the right, Figs. 1 and 18, to deliver the blank to the molding mechanism which is at the rear of the machine and at the right of Fig. 1 of the drawings. As the transfer member makes this movement from its blank-receiving position shown in Fig. 17 to its blank-delivering position shown in Fig. 1, it is rotated in a clockwise direction, Fig. 1, to the extent of 180° and this rotary movement of the transfer member is completed before the transfer member reaches the limit of its movement toward the right, so that as its movement toward the right is completed the blank is shoved edgewise into the female mold of the molding mechanism.

Shortly after the transfer member 30 arrives at the position shown in Fig. 1 the grippers 38 are opened and said transfer member is moved bodily back toward the left and simultaneously rotatively adjusted so that at the completion of this return movement toward the left it again occupies the position shown in Fig. 17 preparatory to receiving the next blank.

Immediately upon arrival of the transfer member 30 at the molding mechanism as shown in Fig. 1, the operation of said mechanism is started and the blank is molded. Upon completion of the molding operation the finished counter stiffener is ejected from the machine by means of an arm 40 that is suitably controlled and operated as will be described presently.

In Fig. 1 of the drawings the parts are shown in the positions they occupy at the start of each cycle of the machine as outlined in Fig. 25.

The machine herein shown includes a continuously actuated main drive shaft 41, Figs. 1, 2, 4 and 8, having fixed thereon a pulley 42 adapted to be engaged by a belt, not shown, through which power is supplied. Shaft 41 also has fixed thereon a pinion 43 driving a gear 44 fast on a main cam shaft 45. The gears 43 and 44 have a ratio of 4 to 1 so that the main cam shaft 45 is rotated once for each four revolutions of the main drive shaft 41. Therefore during each cycle of the machine shaft 41 makes four revolutions and shaft 45 makes one revolution.

At one end thereof the main drive shaft 41 carries a crank arm 46 to which is pivotally connected the lower end of a push rod 47. The push rod 47 extends upwardly through ears or lugs provided upon the outer side of a yoke 48, Figs. 1, 2 and 3, through which said rod is free at times to slide endwise. The yoke 48 has a hub portion that is fixed upon one end of a spindle 49 rotatably mounted in a forked bearing provided at the extremity of one of the arms of a lever 50.

This lever 50 is fulcrumed at 51 on the frame of the machine and its other arm is connected by a link 52, Figs. 1, 2, 4 and 8 with a flange-molding slide 53 mounted in ways provided on a main slide 54. The main slide 54 has rigidly fixed to its rear side an apertured bracket arm 55 slidably mounted upon a vertically disposed guide rod 56 fixedly mounted on the frame of the machine. The frame of the machine includes a cross-bar 57, Figs. 4, 6 and 8 with which the guide rod 56 is connected and against the front side of which the main slide 54 is fitted and held by said guide rod 56.

The supplemental flange molding slide 53 operates upon the heel seat flange of the counter stiffener while the main slide 54, as shown in Figs. 4, 5 and 6 carries the female mold of the forming mechanism which operates upon the sides of the blank.

The upper end of the main slide 54 is connected by a pair of links 58 with one arm of a heavy lever 59 fulcrumed at 60 on the frame of the machine. The other arm of lever 59 extends rearwardly and downwardly from the fulcrum 60 and is connected by a spring link 61 with one arm of a bell crank lever 62 fulcrumed at 63 on the frame of the machine. The other arm of this bell crank 62 carries a cam roll 64 cooperating with a cam 65 fast on the main cam shaft 45. Through the connections just described the main slide 54 is yieldingly urged downwardly once during each cycle of the machine while the push rod 47 is reciprocated endwise four times.

Means is provided whereby two of these reciprocations of the push rod 47 are caused to be effective so as to reciprocate the supplemental flange molding slide 53 twice and to render two of the reciprocatory movements of the push rod 47 idle or ineffective to operate said supplemental slide 53. Thus during each cycle of the machine the main slide 54 is reciprocated once while the supplemental slide 53 is reciprocated twice.

The means just referred to for controlling the action of the push rod 47 on the supplemental slide 53 includes a pair of dogs 66, Figs. 1, 2 and 4 having their upper ends pivotally connected at 67 to the yoke 48. Intermediate their ends the dogs 66 are connected by a spring 68 which yieldingly urges the lower ends of the dogs toward the push rod 47. Upon the inner sides of the dogs 66, and near the lower ends thereof are provided shoulders 69 to cooperate with a collar 70, Figs. 1, 2 and 3, that is fixed rigidly to the push rod 47.

Fulcrumed at 71 on the frame of the machine is a bell crank lever 72 to one arm of which is rigidly fixed a cam or wedge 73, while the other arm of this bell crank is connected by a link 74 with a lever 75 pivoted at 76 on the frame of the machine.

The lever 75 carries a cam roll cooperating with a cam 77 fast upon one end of a shaft 78 journalled in bearings provided upon the frame of the machine. The shaft 78 carries a sprocket wheel 79 connected by a chain 80 with a sprocket wheel 81 fast on the main cam shaft 45.

The cam 77 is shaped and timed so that at the start of each cycle of the machine, and while the crank arm 46 is travelling from the position shown in Fig. 1 to its uppermost position, the cam or wedge 73 is held down out of cooperative relationship with the dogs 66 as shown in Fig. 2. At this time the collar 70 on push rod 47 is between the dogs 66 but above the shoulders 69 thereof. It follows therefore that as the rotation of shaft 41 continues and push rod 47 is pulled down to the limit of its movement in that direction the dogs 66 will be pulled toward each other by the spring 68, and when the collar 70 reaches the limit of its downward movement the shoulders 69 will occupy positions directly above said collar. A stop collar 82 fixed on the push bar 47 near the upper end thereof engages the yoke 48 during the downward movement of the push rod to swing the lever 50 in a direction to raise the flange molding slide 53.

During the next two successive upward movements of the push rod 47 the collar 70, through engagement with the shoulders 69, acts through the dogs 66, yoke 48 and spindle 49 to vibrate the lever 50 thereby reciprocating the flange bending slide 53 twice. After the second reciprocation of slide 53, the cam 77 acts through the connections described to restore the wedge or cam 73 to its upper operative position again so that during the third revolution of shaft 41, and while push rod 47 is descending, the cam or wedge 73 occupies its elevated operative position and serves to spread apart the downwardly descending dogs 66 thereby disengaging their shoulders 69 from the collar 70. It will therefore be clear that during the first and fourth revolutions of shaft 41 of each cycle of the machine the lever 50 and slide 53 remain at rest, while during the second and third revolutions the lever 50 is operated to reciprocate the slide 53.

The rear arm of the lever 50 is provided with a weight 83 which is sufficient to hold the slide 53 elevated when the dogs 66 are disengaged from the collar 70.

The counter stiffener forming or molding mechanism includes a female mold comprising a pair of jaws or mold sections 84, pivotally interlocked by a pintle 85 and fitting flatwise against a depending skirt or wall 86 that is part of the main slide 54. Each jaw 84 is pivotally connected with one end of a toggle link 87 whose opposite end is pivotally connected with the slide 54 and has abutting engagement therewith. These two toggle links normally support the two jaws 84 in position on the slide 54, said toggle links normally resting by gravity against two adjustable stops 88 mounted on said slide. Springs 89 interposed between the jaws 84 and a ledge or shoulder on slide 54 yieldingly urge the two jaws downwardly and apart and hold them in their separated relationship.

The male member of the stiffener molding mechanism is shown at 90, Figs. 4, 6, 8 and 10, said member being a heel-shaped metal block having a depending shank seated upon the head 91 of a screw 92, said shank having a base portion extending laterally forward and fastened to one end of a rock shaft 93 journalled in bearings provided on the head 91. The screw 92 carries a capstan nut 94 resting or seated upon a third lower slide 95 constructed upon its rear side with flanges 96, Fig. 6, movable vertically in ways provided on the cross-bar 56 that is part of the frame of the machine.

To the rear side of the lower portion of the slide 95 are pivotally connected, at opposite sides of said slide, two links 97, Figs. 8 and 10, and the lower end of each of these links is pivotally connected to a lever arm 98 loosely fulcrumed on a cross-bar 99 forming part of the frame of the machine. Each lever arm 98 carries a cam roll 100 cooperating with a cam 101.

The two cams 101 are fast on a shaft 102 journalled in bearings on the frame of the machine and connected at one end with the main cam shaft 45 by sprockets 103 and a chain 104, Figs. 1 and 4. The two sprockets 103 are of the same size and therefore the supplemental cam shaft 102 is rotated in unison with the main cam shaft 45, in the same direction and at the same speed. During the rotation of shaft 102, which occurs once during each cycle of the machine, the lever arms 98, links 97 and slide 95 are raised and lowered, said slide being raised at the start of the cycle and lowered at the conclusion of the cycle.

During each lowering movement of the slide 95, the male member 90 of the forming mechanism is swung laterally on the axis of the rock shaft 93, toward the left in Figs. 1, 8 and 10, thereby to partially remove the molded stiffener from the female section of the mold, and also to bring the molded stiffener into cooperative relationship with the ejector mechanism presently to be described which includes the arm 40 referred to above.

To effect this lateral swing of the male member 90 during the downward stroke of slide 95, the rock shaft 93 is provided adjacent one end thereof with an arm 105 which is free to swing on said rock shaft 93 in one direction to a limited extent but which, when moved in the opposite direction, has abutting engagement with a shoulder on a collar 106 fast on said rock shaft 93. A spring 107 whereof one end is connected with the arm 105 and the other end with a collar fast on rock shaft 93, normally and yieldingly holds the arm 105 at the limit of its movement toward the left, Figs. 8 and 10, with said arm in abutting engagement with the shoulder on collar 106.

At its free end the arm 105 carries a cam roll 108 to cooperate with a cam track 109 fixed on the frame of the machine, and when the slide 95 is moved vertically, this cam roll passes behind cam 109 into a position above the latter so that during the upward movement of slide 95 the arm 105 is swung idly in one direction independently of rock shaft 93.

During the downward movement of slide 95 the fixed cam 109 acts to swing arm 105 in the opposite direction thereby rocking the shaft 93 and tilting the male member 90 outwardly as above referred to. Thus in moving upward the cam roll 108 passes idly behind the fixed cam 109 and in moving downward it passes in front of said cam, the passage of the roll downward in front of cam 109 operating through the arm 105 and rock shaft 93 to tilt the male molding member 90 outwardly to a slight extent. That is, this outward tilting movement imparted to the male molding member 90 is not sufficient to move the center of gravity thereof outwardly beyond the axis of the rock shaft 93 so that as soon as the cam roll 108, moving downwardly with the slide 95, passes the fixed cam 109 the male molding member 90 falls by gravity back into its normal position where it is resting upon the head of the screw 94.

The slide 95 carrying the male member 90 is raised at the start of the cycle of the machine and automatically locked and rigidly supported in this elevated position by an abutment member 110 pivotally mounted upon a cross-bar 111 forming part of the frame of the machine, so that its upper end can be swung into and out of position beneath the lower end of the slide 95. Immediately after the start of the cycle of the machine the slide 95 is raised by the cams 101 and a cam 112 fast on the main cam shaft 45 acts through a lever 113 and link 114 to swing the abutment member 110 from its inoperative position shown in Fig. 8 upwardly into its operative position as shown in Fig. 10 where its upper end is under the slide 95. Immediately thereafter the cams 101 permit the slide 95 to move down into a position where it rests on abutment 110 and where it dwells for about one-half of a revolution of shaft 45.

After the slide 95 has been thus locked in its uppermost position by the abutment, the main upper slide 54 is lowered and the two jaws 84, Figs. 4 and 5, carried thereby move down at each side of the male member 90 and come to rest upon the stiffener blank that is then in position between the male member and the jaws. The downward and inward molding pressure exerted by the two jaws 84 which tends to force the male member 90 and its slide 95 downwardly is opposed by the abutment member 110 which then provides a rigid and unyielding support for the male member 90 and its slide.

During the last half of the revolution of the main cam shaft 45 the cam 65 acts through the connections described to raise the main slide 54 whereupon the cams 101 move the lower slide 95 upward slightly while the cam 112 permits a weight 115, Fig. 1, to swing the abutment 110 outwardly toward the left into its inoperative position shown in Fig. 8 and then as the shaft 45 completes its revolution, the two cams 101 permit the slide 95 to move down into its lowermost position shown in Fig. 8.

The weight 115 is connected with the abutment 110 by a wire cable or the like 116 which extends upwardly from the weight to which one end is fastened, around a sheave 117 to the abutment 110 to which its opposite end is fastened.

On the skirt 86 of slide 54, Figs. 4 and 5, are pivotally mounted two bell crank levers 118, one of which is disposed alongside of each jaw 84 of the female mold member. Each bell crank lever 118 has an upwardly extending arm carrying an antifriction roll 119 to cooperate with the outer side of the adjacent jaw and with a laterally and downwardly extending arm 120, to cooperate with a stiffly yielding abutment 121, Figs. 4 and 7, two of which are provided on the lower slide 95.

Each abutment 121 includes as a part thereof, a plunger having a head seated upon the upper end of a coiled spring 122 mounted at its lower end within a pocket 123 provided upon the top side of an arm projecting laterally from the lower end portion of the slide 95, said plunger having a stem or shank portion fitting telescopically into the upper end portion of its spring.

When the upper main slide 54 is at the limit of its upward movement and the slide 95 is at the limit of its downward movement, the arms 120 of bell cranks 118 are just out of contact with the yielding abutments 121, but when the lower slide 95 is raised and locked in its elevated position, the abutments 121 engage the arms 120 thereby forcing the anti-friction rolls 119 against the outer sides of the jaws 84 and causing the latter to close in forcibly against the opposite sides of the stiffener blank on male member 90. Thereafter the downward movement of the main slide 54 forces said jaws down against the upper end of the male member 90 while the springs 122 forcibly press the jaws 84 inwardly against the opposite sides of the blank. In this way stiffener-molding pressure is applied to both the sides and back of the stiffener blank.

At the start of the cycle of the machine the stiffener blank that is to be molded is held by transfer member 30 so as to occupy a position within the two-part female mold member directly above the male mold member 90 with its opposite end portions bent downwardly toward each other, and shortly after the start of the cycle of the machine the gripper jaws 38 are opened so that the inherent resiliency of the blank tends to spread said opposite end portions apart against the inner sides or surfaces of the two jaws 84.

In order to cause the jaws 84 to hold the blank in this position against displacement before the application of the molding pressure, the pintle 85 by which the two jaws 84 are pivotally interlocked is extended beyond the rear sides of the latter as shown in Fig. 8 to cooperate with an adjustable abutment screw 124, occupying a threaded aperture at the top of the rear portion of slide 95, said abutment screw being adjusted and set so that as the two slides 54 and 95 are moved relatively toward each other near the start of the cycle of the machine, said screw 124, by engagement with the pintle pin 85, swings the two jaws 84 inwardly against the pressure of the springs 89, said jaws pivoting upon the lower ends of the toggle links 87, with the result that the depending portions of the jaws 84 are swung inwardly against the side portions of the stiffener blank thereby clamping the blank in position against accidental displacement before the full side molding pressure of said jaws is occasioned by the engagement of the arms 120 with the abutments 121.

The bell cranks 118 are swung on their pivots by engagement of the arms 120 thereof with the abutments 121 to transmit side molding pressure to the jaws 84, and as the two slides are moved apart at the conclusion of the molding operation, each bell crank 118 is swung in the opposite direction by gravity into position against a stop 125.

The skirt or back plate 86 forming part of the slide 54 is formed at its middle with a vertical slot 126, Fig. 5, that is occupied by the rear portion of the pintle 85 and which is also occupied by a narrow vertical stem-like portion of the slide 95 as shown in Figs. 6, 8 and 10.

Each stop 88 is a member pivotally mounted upon the skirt 86 and made with two arms, one of which engages its toggle link 87. The other arm of each member 88 is cooperatively disposed with relation to an adjustable abutment screw 127 mounted upon the skirt 86. By means of these screws the stops 88 may be positioned to properly cooperate with their toggle links 87 and to centralize the two-part female mold member.

The blanks which are delivered to the transfer member 30 are taken by the picker 27 from a stack resting upon a blank support or follower 128, and as the blanks are successively removed from this holder or follower by the picker said holder is automatically raised step by step so as to maintain the top of the stack at a predetermined height, so that the spike 29 of the picker 27 will engage the topmost blank each time said picker descends to the limit of its downward movement.

A stack of twenty blanks is initially positioned upon the holder 128 and when the last of these is removed by the picker, the holder 128 is returned by one quick movement to its lowest position where its upper end is just below the plane of the bottom of the table 25, whereupon said table is automatically rotated one step in a contra-clockwise direction, Fig. 11, so as to carry another pile of twenty blanks into a position immediately above the upper end of the holder 128.

The table 25 dwells in this position until that fresh stack of twenty blanks is exhausted, whereupon the holder 128 returns to its lowest position again and another step movement of the table 25 is effected. Thus the supply of blanks on th holder 128 is intermittently replenished at the end of each twenty operations of the picker 27.

The table 25 is made with apertures 129, which provide passages through one of which the holder 128 rises and falls as described during each period of rest of the table 25.

The bracket 28 includes as a part thereof, an upwardly extending plate 130, Figs. 13, 20 and 21, to which the two lower end members 131 of a lazy-tongs structure 132 are pivotally connected as at 133. A spring 134 connecting the free ends of the two members 131 is continuously under tension and yieldingly exerts force upon said members in a direction to extend the lazy-tongs 132. At the upper end of the lazy-tongs 132 the two end members 135 are pivotally connected at 136 to the picker bar 27, so that said spring 134 acting through the lazy-tongs 132 yieldingly urges the picker bar 27 upwardly.

Near its upper end the picker bar has connected with it one end of a flexible cable 137 whose opposite end is connected to a sheave 138 compounded with a pinion 139.

Sheave 138 with its pinion 139 is loosely and rotatably mounted upon a cross-bar 140 forming part of the frame of the machine and said pinion is in mesh with a segment lever 141 fulcrumed at 142 upon a bracket 143 forming part of the frame of the machine. The lever 141 carries a cam roll 144 that is held against a cam 145 by a spring 146. The cam 145 is fast on a shaft 147 that is continuously driven in a contra-clockwise direction, Fig. 20, as will be presently described, said shaft making one revolution during each cycle of the machine.

The cam 145 operates to swing the lever 141 in one direction to shift the picker bar 127 downwardly against the pull of spring 134, Fig. 21, while said spring, assisted by the spring 146, operates at times to swing the lever 141 in the opposite direction to raise the picker bar 127. In this way the picker bar 127 is raised and lowered in timed relation with the other elements of the machine.

The shaft 147 just referred to has fast on it two other cams, Figs. 13, 14 and 16, including a cam 148 for operating the pusher fingers 35 and a cam 149 for operating the pusher member 37.

The pusher fingers 35 are adjustably secured to a carriage 150 slidably mounted on the picker rod 27 below the bracket 28, said slide being yieldingly urged downward by means of a spring 151. This slide is omitted in Fig. 20. The opposite sides of carriage 150 are connected by links, one of which is shown at 152, with a pair of lever arms 153 fast on a rock shaft 154 journalled in a bracket 155 forming part of the frame of the machine. This rock shaft 154 has fixed to it a third arm 156 carrying a cam roll that is held against the cam 148 by a spring 151.

The pusher 37 is an angular arm fast on a rock shaft 157 journalled in bearings on bracket 155 and provided with an arm 158 carrying a cam roll that is held against the cam 149 by a spring 159.

The shaft 147 also has fixed on it a sprocket wheel 160 connected by a sprocket chain 161, Figs. 1, 14, and 17, with a sprocket wheel 162 fast on a shaft 163 journalled in bearings on the frame of the machine. This shaft 163 which is continuously rotated in a contra-clockwise direction, Fig. 17, carries a sprocket wheel 164 connected by a chain 165 with a sprocket wheel 166, Fig. 4, fast on one end of the shaft 78 above referred to.

Shaft 163 also carries a cam 167, Fig. 1, engaging a cam roll carried by a lever arm 168 fulcrumed at 169 on the frame of the machine. The lever arm 168 is connected by a cable 170 with a sheave 171, Figs. 1 and 11, fast on a short horizontal shaft 172 journalled in a bearing on the frame of the machine and to which is also fixed the ejector arm 40. Through the connections described, the cam 167 operates the ejector 40 in timed relation with the movements of the other elements of the machine.

The justifying member 33 by means of which the blank is angularly adjusted on the spike of the picket rod 27, as above described, is adjustably mounted upon a carriage 172, Figs. 1, 13, 14, 15 and 16, slidably mounted upon a rigid bar 173 forming part of the frame of the machine so as to move toward and from the transfer member 30 when the latter occupies its position at the limit of its movement toward the picker rod 27. The supporting bar 173 projects laterally from a cross-bar 174 forming part of the frame of the machine and near its free end it has fixed thereon a collar 175 between which and the carriage 172, is arranged a coiled spring 176 that is installed under initial compression so as to yieldingly urge the carriage 172 toward the path of the picker rod 27. The carriage 172 is held against turning on the rod 173 by means of a pin 177 projecting laterally from the carriage loosely through an apertured ear 178 extending downwardly from the cross-bar 174.

To the carriage 172 is connected one end of a cable 179 which extends forwardly around two sheaves 180 and 181 supported by the collar 175, and thence rearwardly around a sheave 182 loosely mounted on the cross-bar 174 and thence downwardly and forwardly to a bell crank lever 183, Figs. 1 and 13, to one arm of which the opposite end of said cable is connected.

The bell crank lever 183 is loosely fulcrumed on a cross-bar 184 forming part of the frame of the machine, and its other arm carries a cam roll that is held against a cam 185 by means of the spring 176, Fig. 16. The cam 185 is fast on a shaft 186, Figs. 1 and 13, journalled in bearings on the frame of the machine and provided with a sprocket wheel 187 connected by a chain 188 with a sprocket wheel 189 fast on the cam shaft 147 above referred to.

As shown in Figs. 13 to 16, inclusive, the supporting rolls 36 serve as an abutment gage for positioning the blank just before the grippers 38 are closed to hold the same to the transfer member 30, and therefore said rolls occupy a position immediately below and in the path of movement of the picker rod 27 when the blank B is shoved downwardly by the pusher fingers 35. These rolls 36 are rotatably mounted upon horizontal spindles forming part of the carriage 172 and as the picker rod 27 starts downwardly upon its movement toward the blank holder 128 the cam 185 acts through the connections described to move the carriage 172 toward the left in Fig. 16, thereby removing the rolls 36 from the path of the picker rod and moving the justifier 33 away from the position occupied by the blank when it is lifted by the picker rod into the position shown in said figure. The cam 185 causes the carriage 172 to dwell in this retracted inoperative position while the picker rod descends to the stack of blanks and until it has returned to its uppermost position again where it supports the blank in position alongside of the transfer member 30.

The two wipers 32 are disposed at opposite sides of the path of the picker rod 27 and each is an arm projecting from a rock shaft 190 journalled in a bearing on the frame of the machine and provided at its free end with a roll 191 to engage the stiffener blank. Fast on each shaft 190 is a sheave 192 and these two sheaves are connected by a cable or the like 193 so that when rotary movement is imparted to either in a clockwise direction it acts through said cable to oppositely actuate the other sheave. On one of the rock shafts 190 is fixed a second sheave 193 to which one end of a flexible cable 194 is fastened. This cable extends downwardly from the sheave 193 around a sheave 195 loosely mounted on the cross-bar 174 and thence forwardly to a bell crank lever 196, Fig. 1, to one arm of which its opposite end is fastened. The other arm of bell crank 196 carries a cam roll cooperating with a cam 197 fast on the shaft 186.

Immediately after the picker rod 27 carrying a blank reaches its uppermost position, the cam 197 in cooperation with a spring 198, Fig. 14, effects an upward swinging movement of the two wipers 32 from the lowermost positions thereof indicated by dotted lines in Fig. 13 to their uppermost positions indicated by dot and dash lines in said figure thus bending the opposite end portions of the blank around the shoe 34, Fig. 17 into position to be engaged by lugs 199 provided on the push fingers 35 and also in positions to be engaged by the grippers 38 after the pushers 35 have shoved the blank downwardly on to the positioning rolls 36.

The transfer member 30, Figs. 1, 17, 18 and 19, is a bifurcated bracket arm fastened at 200, Fig. 18, to a shaft 201 that is part of a carriage which is slidably mounted upon a pair of horizontal arms 202 forming part of the frame of the machine.

On this shaft 201 is rotatably mounted a sleeve 203 which extends from one side of the machine inwardly to the middle thereof where it has fixed to it an upwardly extending arm 204 connected by two links 205 and 206 with arms forming part of the grippers 38. Each gripper 38 is pivotally fastened to the transfer member 30 at 207 and said grippers are made with arms 208 connected by a spring 209. When the grippers are in their open positions, as shown in Fig. 18, the axis of the spring 209 is offset at one side of a line connecting the pivots 207, so as to yieldingly hold the grippers in their open positions, but when the arm 204 is swung to the right, Fig. 17, said spring is shifted sidewise into a position where its axis is at the opposite side of a line passing through said pivots. Therefore the spring 209 serves also to hold the grippers 38 in their closed positions.

The sleeve 203 and shaft 201 are rotatably supported by two slides 210 mounted upon the rods 202, and each slide 210 is connected by a link 211 with a lever 212 loosely fulcrumed upon the cross-bar 140 forming part of the frame of the machine. Each lever 212 carries a cam roll 214 held by a spring 215 against a cam 216 fast on the shaft 147.

During the rotation of shaft 147, the springs 215 and cams 216 act through the connections described to reciprocate the slides 210 on the rods 202 so as to shift the transfer member 30 back and forth between the picker rod 27 and the molding mechanism.

At one end thereof the shaft 201 has fixed on it a sheave 217 to which one end of a flexible cable 218 is fastened, the opposite end of said cable being connected through a spring 219, with the frame of the machine as shown in Fig. 1.

Mounted on the shaft 201 is a coiled spring 220 one end of which is fastened to a disc 221 fast on shaft 201 and the other end to the adjacent slide 210. This spring is incorporated in the machine under initial stress tending to rotate the shaft 201 in a clockwise direction, Fig. 17, and it will be clear that as the slides 210 are moved toward the molding mechanism the spring 220 will rotate shaft 201 and sheave 217 in this clockwise direction, and it will also be clear that as the slides 210 move from the molding mechanism toward the picker rod 27, the cable 218 will act through the sheave 217 to rotate the shaft 201 in the opposite direction thereby winding up the spring 220. Rotation of the shaft 201 is limited to exactly 180° by means of a pin or stud 222 projecting from disc 221 and cooperating with two stop screws 223 and 224, Figs. 18 and 19.

It will thus be clear that as slides 210 are reciprocated on the rods 202, the cable 218 and spring 220 cooperate to oscillate the shaft 201 and the transfer member 30, the latter being swung around the axis of shaft 201 to the extent of one half of a revolution in a clockwise direction, Fig. 17, while moving from the picker rod 27 toward the molding mechanism and being swung in the opposite direction to the same extent while moving from the molding mechanism toward the picker rod 27.

The diameter of the sheave 217 is made such that during the movement of the transfer member 30 toward the molding mechanism said member completes its rotary movement in a clockwise direction just before the stiffener blank carried thereby reaches the molding mechanism so that for a short distance near the end of the movement of the slides 210 toward the molding mechanism, the stiffener blank is shoved edgewise in a straight horizontal direction into position within the female mold of said mechanism, while the pin 222 is resting against the stop screw 224.

Also during the movement of the slides 210 toward the picker rod 27, and shortly before said slides reach the limit of their movement in that direction, the pin 222 engages the stop screw 223 so that the last part of the movement of the transfer member toward the picker rod 27 is made in a straight horizontal path. While said transfer member is traversing this short straight horizontal path the spring 219, Fig. 1, is stretched.

It therefore follows that at the start of the movement of the transfer member toward the molding mechanism with a blank the spring 219 serves to hold the pin 222 against the stop screw 223 until said spring has contracted to its normal condition after which the spring 220, Fig. 18, rotates the transfer member on the axis of shaft 201 as it travels toward the molding mechanism. Thus the spring 219, as compared with the spring 220, is of predominating strength.

The purpose in imparting a preliminary straight horizontal movement to the transfer member 30 as it moves away from the picker rod 27 at the start of its travel toward the molding mechanism is to shift the blank B away from the lower end of the picker rod so that when the transfer member starts upon its swing over the shaft 201 said blank will not strike the lower end of the picker rod. The purpose of the short straight horizontal movement of the transfer member 30 effected at the conclusion of the movement thereof toward the transfer mechanism is to cause the blank to be shoved edgewise into position within the female mold.

The grippers 38, Fig. 18, are closed on to the blank as the transfer member 30 is about to start upon its movement toward the molding mechanism and said grippers are opened to free the blank as said transfer member is about to start upon its movement back toward the picker rod 27.

The means for thus operating the grippers 38 includes the sleeve 203, referred to above, to the outer end of which is fixed a pair of diametrically opposite arms 225 and 226 carrying cam rolls 227 and 227a, respectively.

Adjacent the outer end of the sleeve 203 is a horizontal shaft 228 journalled near its opposite ends in bearings on the frame of the machine, and at its rear end this shaft 228 is connected by mitre gears 229, Figs. 1 and 4, with the lower end of a short vertical shaft 230 also journalled in a bearing on the frame of the machine. At its upper end the shaft 230 is connected by mitre gears 231 with the shaft 78 before referred to and it will therefore be clear that shaft 228 is rotated in a clockwise direction, as indicated by the arrow in Fig. 13.

On the shaft 228 are fixed two cam arms 232 and 233 cooperating, respectively, with the rolls 227 and 227a.

When the transfer member 30 reaches the limit of its movement toward the picker rod 27 the roll 227 occupies a position horizontally opposite the shaft 228 and within the path of the cam arm 232. Thereafter just as the transfer member is about to start on its travel toward the molding mechanism said cam arm 232 engages the roll 227 and acts through arm 225, sleeve 203, arm 204 and links 205 and 206, to close the grippers 38 on to the blank. It therefore follows that when the transfer member reaches the limit of its movement toward the molding mechanism as indicated by dotted lines Fig. 17, the reversal of the transfer member 30, made during its travel in this direction, places the cam roll 227a horizontally opposite the shaft 228 and directly in the path of the other cam arm 233. The cam arm 233 is timed to engage the cam roll 227a just at the start of the movement of the transfer member 30 toward the picker rod 27 and when it thus engages said roll it acts through arm 226, sleeve 203, arm 204 and links 205 and 206, to open the gripper members 38 so as to free the blank and leave the latter within the female mold.

The stack from which the blanks are delivered to the transfer member 30 by the picker rod 27 is, as pointed out above, carried by the vertically adjustable support 128, Figs. 20 and 24, and this support is made with a depending stem that is slidably mounted in ways provided upon a bracket 234 that is part of the frame of the machine, said bracket being fastened to a cross-bar 235 of said frame.

Near its lower end the stem of support 128 has connected to it one end of a flexible cable 236 which extends upwardly therefrom and has its upper end fastened to a sheave 237 fast on a transverse shaft 238 journalled in bearings on the frame of the machine, Figs. 1, 11, 20, and 24. On this shaft is also fixed a ratchet wheel 239 with which a detent 240 and pawl 241 cooperate. The detent 240 and ratchet 239 are within a box-like bracket 242 that is supported by the cross-bar 235 forming part of the frame of the machine and the shaft 238. On the shaft 238 is loosely pivoted one end of an arm or link 244 whose opposite end is pivotally connected by a pin 245 with the pawl 241. The pin 245 also pivotally connects one end of a link 246 to said pawl 241 and arm 244, the opposite end of said link being pivotally connected to one arm of a bell crank lever 247 fulcrumed on the cross bar 184 referred to above. The opposite arm of bell crank 247 carries a cam roll cooperating with a cam 248 fast on the shaft 186, also referred to above.

During the operation of the machine the cam 248 acts through the connections described, and in cooperation with a spring 249, Fig. 20, to reciprocate the pawl 241, the free end of the latter resting upon and being guided by a pin or bar 250. Normally the pawl 241 is held by cam 248 at the limit of its feed movement toward the ratchet wheel but once during each rotation of said cam the pawl is operated to rotate ratchet 239 and shaft 238 in the direction of the arrow to the extent of one tooth of said ratchet, said movement being imparted to the ratchet and shaft just as the picker bar 27 starts from its lowermost position toward its upper position. Each operation of the pawl 241 acts through the ratchet wheel, shaft and cable 236 to raise the support 128 a step that measures about the same as the thickness of a blank. Thus the top of the stack of blanks carried by support 128 is maintained approximately at a predetermined height, viz., at the position occupied by the lower end of picker rod 27 when the latter is at the limit of its downward movement.

The detent 240 is fixed to a short spindle 251 journalled in bearings on the box-like bracket 242 and said spindle 251 also carries, outside of bracket 242 a dog 252 cooperating at its free end with a disc 253 loosely mounted on the shaft 238 immediately alongside the box-like bracket 242. This disc 253 is formed upon its periphery with a notch 254 that is normally occupied by the free end or nose of the dog 252.

Just outside of the disc 253 a segmental arm 255 is provided that is fixed to shaft 238 and which cooperates with a laterally projecting lug 256 that is provided upon the outer face of disc 253.

During the operation of the machine the latter, as a whole, passes through a major cycle involving twenty operations of the molding mechanism and of the above described feed mechanism, as well as twenty step movements of the shaft 238 and parts carried thereby, and twenty upward step movements of the blank support 128.

As the pawl 241 completes its nineteenth ratchet engaging movement during each major cycle of the machine as a whole, or in other words, as the ratchet wheel 239 and arm 255 complete their nineteenth step movement, the said arm 255 comes into position against the lower side of the lug 256. Therefore, when the said ratchet and arm make their twentieth step movement the arm 255 moves the lug 256 and disc 253 with it to the extent of one tooth of ratchet 239. This rotative displacement of the disc 253 cams the free end of the dog 252 out of the notch 254 thereby rocking the spindle 251 in a clockwise direction, Fig. 24, and lifting detent 240 out of engagement with ratchet 239. As the pawl 241 starts upon its next reciprocatory movement the blank support 128 falls by gravity to the limit of its downward movement which is determined by the engagement of the arm 255 with the lug 256 and the resulting engagement of a shoulder 257 on disc 253 with the end of dog 252, the shaft 238 to which the arm 255 is fastened being at this time reversely rotated by the downward movement of support 128 acting through cable 236 and sheave 237.

Thus the major cycle of the machine as a whole involves twenty step movements of shaft 238 in a contra-clockwise direction followed by a quick return movement to its starting position shown in Fig. 24 that is effected at the very start of the next or following major cycle of the machine.

Immediately, at the start of the major cycle of the machine, and while the picker rod 27 is rising with the last blank taken from the support 128, a step movement is automatically imparted to the turntable 25 thereby bringing one of the reserve stacks on said table into position directly above the upper end of the support 128.

The turntable 25 is thus rotated at the start of the major cycle of the machine by mechanism including a cam 258 fast on shaft 186 which cooperates with a cam roll carried by one arm of a bell crank lever 259 that is loosely fulcrumed on the cross-bar 184 of the frame. The other arm of bell crank 259 has connected to it one end of a cable 260 which extends therefrom around a sheave 261, Figs. 11, 22 and 23, and thence to one arm of a second bell crank lever 262 fulcrumed at 263 on the frame of the machine so as to swing on a vertical axis.

The other arm of this second bell crank 262 has connected to it one end of a link 264 and one end of a spring 265. The opposite end of the spring 265 is connected with the frame of the machine while the opposite end of the link 264 is connected with a pawl carrier 266 loosely mounted upon a sleeve 267 that is part of the hub of the turntable 25, said sleeve being rotatably mounted upon a vertically disposed round rod or bar 268 that is part of the frame of the machine. At its lower end the sleeve 267 has fast on it a ratchet wheel 269 engaged by a pawl 270 mounted on the pawl carrier 266.

The sheave 261, Fig. 23, above referred to, is rotatably supported on a bracket 272 that is part of the frame of the machine and upon this bracket 272 is pivotally mounted at 273 a latch 274 normally held by a spring 277 in engagement with a stud 275 projecting from one side of the bell crank 259 so that the latter is held normally out of cooperative relationship with cam 258. The rear arm of the latch 274 carries a cam roll cooperatively disposed with relation to an arm 276 projecting from the shaft 238.

When the detent 240, Fig. 24, is disengaged from the ratchet 239 by the engagement of the disc 253 with dog 252, and blank support 128 falls as above described to its lowermost position and acts through the cable 236 to return shaft 238 to its starting position, the arm 276 on said shaft is swung in the direction of the arrow in Fig. 22 into engagement with the cam roll carried by latch 274 so as to disengage said latch from the stud 275 of bell crank 259 as shown in Fig. 23. The disengagement of the latch from the bell crank permits the spring 265, Fig. 11, to act through bell crank 262 and cable 260 to swing the cam roll of bell crank 259, Fig. 23, into position immediately in front of the throw of cam 258 as the latter approaches said cam roll. This movement of bell crank 262 acts through the link 264 to effect the recovery movement of pawl carrier 266 and pawl 270, and as the cam 258, Fig. 23, passes the cam roll of bell crank 259 it acts through the latter, cable 260, bell crank 262 and link 264 to swing the pawl carrier 266 and pawl 270 in a direction to rotate the turntable 25 one step in the direction indicated by the arrow in Fig. 11. This is followed immediately by a step movement of ratchet 239 and shaft 238 with the result that the arm 276, Fig. 23, is moved away from the roll on latch 274 in the direction of the arrow in said Fig. 23 so that the latch is moved upwardly by its spring into engagement with the stud 275 as the cam 258 passes the cam roll of bell crank 259.

In this way the table operating mechanism is automatically controlled so as to move the table 25 as described once at the start of each major cycle of the machine as a whole. Thus each major cycle of the machine starts with the arm 277 occupying the position illustrated in Fig. 23 and during said cycle said arm is moved intermittently twenty steps in the direction of the arrow and at the conclusion of these twenty steps it occupies the position shown in Fig. 22 at which time the disc 253 is operated to act through the devices described to free the ratchet 239 whereupon the fall of the blank support 128 returns the arm 276 by one quick movement in the direction of the arrow Fig. 22, to the position shown in Fig. 23.

The ejector member 40 referred to above has its shaft or spindle 172 obliquely disposed as shown in Fig. 11 so that when it is swung inwardly at the start of the movement of transfer member 30 toward the molding mechanism, its free end which is more or less sharpened comes to rest against the outer vertical face of the male mold member 90 directly below the inturned molded heel seat flange of the counter stiffener that has just been completed. Therefore as the two slides 54 and 95, Fig. 8, are moved apart, one upwardly and the other downwardly, the molded stiffener adheres to the male mold member 90 and moves down with it until the sharpened end 40a of ejector 40 comes into position between the heel seat flange and the male mold member 90. Thereafter the continued downward movement of the male mold member 90 frees the molded stiffener from the latter leaving it hanging upon the sharpened end of the ejector 40. As soon as the molded stiffener has thus been freed the ejector 40 is snapped outwardly toward the side of the machine, out of the path of the approaching transfer member 30 and with sufficient speed and force to throw the molded stiffener clear of the machine.

During the time that the ejector 40 rests against the outer face of the male mold member 90, and while the latter is descending, said male mold member is tilted outwardly by the cam roll as above described thereby disengaging and partly removing the molded stiffener from the female mold and insuring engagement therewith of the end of the ejector 40.

What I claim is:

1. In a machine of the character described, the combination with counter stiffener-blank molding mechanism, of means for holding a supply of blanks in stacked relationship; a vertically movable picker member above said blank-holding means provided at its lower end with a spike; means for operating said picker member to cause it to impale the topmost blank of said stack upon said spike and to lift said blank into an elevated position; automatically operated wiper mechanism engaging the opposite end portions of each blank while it is held elevated by said picker member to bend said blank into a sharply bowed flexed condition, and means for automatically transferring each blank from said picker member to said molding mechanism while maintaining said blank in its bent condition.

2. In a machine of the character described, the combination with molding mechanism, of means for holding a supply of blanks in stacked relationship; a vertically movable picker member above said blank-holding means provided at its lower end with a spike; means for operating said picker member to cause it to impale the topmost blank of said stack upon said spike and to lift said blank into an elevated position; automatically operated wiper mechanism engaging the opposite end portions of each blank while it is held elevated by said picker member to bend said blank into a sharply bowed flexed condition; means for transferring each blank from said picker member to said molding mechanism operating in timed relation with the latter and including automatically operated blank-gripping mechanism; and automatically operated means for pushing each blank off from said spike and delivering it to said transferring mechanism so as to be engaged by the blank-holding mechanism of the latter by which said blank is maintained in its bent condition while being transferred to said molding mechanism.

3. In a machine of the character described, the combination with molding mechanism, of means for holding a supply of blanks in stacked relationship; a vertically movable picker member above said blank-holding means provided at its lower end with a spike; means for operating said picker member to cause it to impale the topmost blank of said stack upon said spike and to lift said blank into an elevated position; wiper mechanism engaging the opposite end portions of each blank while it is held elevated by said picker member to bend said blank into a sharply bowed flexed condition; a transfer member movable toward and from said molding mechanism; means for operating said transfer member in timed relation with said molding mechanism; a pusher member automatically engaging the blank after it has been elevated by said picker member and bent by said wiper mechanism to disengage the same from said spike; a pusher member for shifting the blank into co-operative relationship with said transfer member when freed from said spike; blank-gripping mechanism on said transfer member which maintains said blank in its bent condition while it is being transferred to said molding mechanism, and means for automatically operating said gripper mechanism in timed relation with the movements of the transfer member.

4. In a machine of the character described, the combination with the stiffener-blank molding mechanism, of means for holding a supply of stiffener blanks; means operating in timed relation with said molding mechanism for transferring said blanks individually to the latter; a turntable for holding reserve supplies of stiffener blanks, and automatic means including operating mechanism for said turntable for replenishing the supply of blanks of said blank-holding means from said reserve supply.

5. In a machine of the character described, the combination with counter stiffener-blank molding mechanism, of blank feeding mechanism operating in timed relation with said molding mechanism and including a vertically movable picker member; a vertically movable support for a stack of stiffener blanks from the top of which the blanks are removed one at a time by said picker member; means for adjusting said support vertically during the operation of the machine to maintain the top of the stack at a predetermined height and means operated independently of the upward movements of said vertically adjustable support but in timed relation therewith for automatically effecting the return of said support to its lowermost position when its supply of blanks is exhausted.

6. In a machine of the character described, the combination with counter stiffener-blank molding mechanism of blank feeding mechanism operating in timed relation with said molding mechanism and including a vertically movable picker member; a vertically movable support for a stack of stiffener blanks from the top of which the blanks are removed one at a time by said picker member; means for adjusting said support vertically during the operation of the machine to maintain the top of the stack at a predetermined height; means operated independently of the upward movements of said vertically adjustable support but in timed relation therewith for automatically effecting the return of said support to its lowermost position when its supply of blanks is exhausted, and automatic means for replenishing the supply of blanks on said support when it is thus returned to its lowermost position.

7. In a machine of the character described, the combination with counter stiffener-blank molding mechanism, of blank feeding mechanism operating in timed relation with said molding mechanism and including a vertically movable picker member; a vertically movable support for a stack of stiffener blanks from the top of which the blanks are removed one at a time by said picker member; means for adjusting said support vertically during the operation of the machine to maintain the top of the stack at a predetermined height; means operated independently of the upward movements of said vertically adjustable support but in timed relation therewith for automatically effecting the return of said support to its lowermost position when its supply of blanks is exhausted, and means for replenishing the supply of blanks upon said support when the latter is thus returned to its lowermost position, said replenishing means including a turntable for holding a plurality of stacks of blanks and means for intermittently operating said turntable to present said stack successively to said support in timed relation with the movements of the latter.

8. In a counter stiffener molding mechanism, in combination, a male molding member; a slide on which said male mold member is mounted; a female mold; a slide on which said female mold is mounted; means for operating said slides; a pivotally supported abutment member for rigidly supporting the said first-mentioned slide and the male mold member at the limit of their movements toward the female mold while a stiffener blank is being molded, and means for automatically swinging said abutment member on its pivot into and out of operative position in timed relation with the movements of said slides.

9. In a counter stiffener molding mechanism, the combination of a slide; a female mold carried by said slide consisting of a pair of molding jaws pivotally mounted upon said slide and movable sidewise toward and from each other; a pair of jaw-engaging bell crank levers pivotally mounted on said slide; a male mold member co-operating with said female mold; a second slide on which said male mold member is mounted; means to reciprocate said slides toward and from each other, and means on said second slide for engaging said bell crank levers thereby to cause the latter to force said jaws sidewise toward each other when said two slides are moved toward each other.

10. In a counter stiffener molding mechanism, the combination of a female mold consisting of a pair of relatively movable jaws, a slide on which said jaws are pivotally mounted to move sidewise toward and from each other; a pair of jaw-engaging bell crank levers mounted on said slide; a second slide; a male mold member carried by said second slide; means to reciprocate said two slides toward and from each other, and stiffly yielding abutments provided on said second slide to engage said bell crank levers when said two slides are moved toward each other thereby to cause said bell crank levers to forcibly urge said jaws sidewise toward each other and toward said male mold member.

11. In a counter stiffener molding mechanism, in combination, a movably supported slide-operating member; a dog carried by said member; a bar slidably connected with said member having a shoulder to cooperate with said dog to actuate said member; a crank arm pivotally connected to said bar by which the latter is reciprocated; a shaft on which said crank arm is mounted and means for automatically controlling said dog to cause said member to dwell at rest during one revolution of said shaft and to cause said shoulder acting through said dog to actuate said member during another revolution of said shaft.

12. In a counter stiffener molding mechanism, in combination a movably supported slide-operating member; a dog carried by said member; a bar slidably connected with said member having a shoulder to co-operate with said dog to actuate said member; a crank arm pivotally connected to said bar by which the latter is reciprocated; a shaft on which said crank arm is mounted; a second cam shaft; gearing connecting said two shafts so that said cam shaft rotates at a slower speed than said crank shaft and automatic means for controlling said dog so that said member is at rest during one revolution of said crank shaft.

13. In a counter stiffener molding mechanism, the combination of a driven crank shaft; a slide operating cam shaft; gearing through which said cam shaft is driven by but at a slower speed than said crank shaft; a crank on said crank shaft; a bar pivotally connected adjacent one end to said crank, a movably supported slide-operating member with which said bar is slidably engaged; a shoulder on said bar directly engaging said member to move the latter in one direction; a dog pivotally mounted on said member; another shoulder on said bar for engaging said dog to move said member in the opposite direction and automatic means for controlling said dog so that said crank operates through said bar during one revolution to reciprocate said member and so that during another revolution of said crank said dog is maintained out of co-operative relationship with its shoulder on said bar and said member then dwells at rest.

Signed by me at Boston, Suffolk County, Massachusetts, this 29th day of April, 1929.

JOSEPH SPADAFORA.